United States Patent
Savov et al.

(10) Patent No.: US 7,580,145 B2
(45) Date of Patent: Aug. 25, 2009

(54) METHOD AND APPARATUS FOR EFFECTIVE JOB MANAGEMENT

(75) Inventors: Andrey I. Savov, Fullerton, CA (US); Ajit Sodhi, Irvine, CA (US); Man Mohan Garg, Cerrtios, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 1098 days.

(21) Appl. No.: 10/888,877

(22) Filed: Jul. 9, 2004

(65) Prior Publication Data

US 2006/0007463 A1   Jan. 12, 2006

(51) Int. Cl.
*G06F 3/12* (2006.01)
(52) U.S. Cl. .................... 358/1.15; 358/1.13; 358/1.14; 718/102; 718/103; 718/106
(58) Field of Classification Search ................ 358/1.15, 358/1.14, 1.13; 718/102, 103, 106
See application file for complete search history.

(56) References Cited

U.S. PATENT DOCUMENTS

| | | | |
|---|---|---|---|
| 5,467,434 A * | 11/1995 | Hower et al. ................ | 358/1.15 |
| 5,600,762 A | 2/1997 | Salgado et al. | |
| 5,923,826 A * | 7/1999 | Grzenda et al. ............. | 358/1.15 |
| 5,930,465 A * | 7/1999 | Bellucco et al. ............. | 358/1.15 |
| 5,970,224 A * | 10/1999 | Salgado et al. ............. | 358/1.16 |
| 6,069,707 A | 5/2000 | Pekelman | |
| 6,252,614 B1 | 6/2001 | Mullin | |
| 6,327,050 B1 * | 12/2001 | Motamed et al. ........... | 358/1.18 |
| 6,450,571 B1 * | 9/2002 | Canni et al. ............ | 297/188.04 |
| 6,501,559 B1 | 12/2002 | Salgado et al. | |
| 6,556,309 B1 | 4/2003 | Campbell et al. | |
| 6,570,670 B1 * | 5/2003 | Salgado et al. ............. | 358/1.15 |
| 6,614,542 B1 | 9/2003 | Salgado et al. | |
| 6,651,081 B1 | 11/2003 | Salgado et al. | |
| 6,671,065 B1 * | 12/2003 | Salgado et al. ............. | 358/1.16 |
| 7,298,503 B2 * | 11/2007 | Christiansen et al. ...... | 358/1.13 |
| 2003/0011605 A1 | 1/2003 | Mullin | |
| 2003/0160795 A1 | 8/2003 | Alcorn et al. | |
| 2003/0193683 A1 * | 10/2003 | Motamed et al. .......... | 358/1.13 |
| 2004/0061892 A1 | 4/2004 | Ferlitsch | |

* cited by examiner

*Primary Examiner*—Twyler L Haskins
*Assistant Examiner*—Jacky X Zheng
(74) *Attorney, Agent, or Firm*—Tucker Ellis & West LLP

(57) ABSTRACT

The present invention is directed to a method and apparatus for the job management of document processing wherein job management is divided into a pipeline assembly phase and a job processing phase. The job manager is heavily involved in the pipeline assembly phase. The job processing phase involves only the job processors, which were identified during the pipeline assembly phase. The processors signal the job manager when they start or finish processing of a job. The job manager controls resource consumption by controlling the amount of data in the pipes by parameterizing connector elements. For example, the job manager will preferably input data relating to stapling operations into the pipeline after data relating to collating operations is feed into the pipeline. The job manager assembles partial data or operations into the pipeline in the event that all resources needed are not available. In the event that a stapling operation is not possible, the job manager will still feed data related to other jobs so that the process may be completed to the extent possible.

14 Claims, 2 Drawing Sheets

METHOD AND APPARATUS FOR EFFECTIVE JOB MANAGEMENT

BACKGROUND

This invention is directed to a method and apparatus for document processing job management. More particularly, this invention is directed to a method and apparatus for the job management of document processing wherein job management is advantageously divided into a pipeline assembly phase and a job processing phase.

Multifunction peripherals or document processing devices operate on a job concept, wherein a job is the smallest piece of work on which the multifunctional peripheral operates and tracks. Jobs are typically organized in queues which define the processing order for each job, each queue typically contain one type of job. Each job is handled by a number of processors which perform specific operations on the job. Instructions for such handling are contained within a job ticket. The job ticket contains additional information, known as job metadata, about the job which is forwarded to the processors depending on the processors own requirements. Every queue is normally associated with a job ticket, which applies to all jobs within the queue.

Complexities of job management are tremendous, especially with respect to the effectiveness of such job management within specified constraints. An average number of jobs handled can often vary from 10 to 10,000. Each job has its own state, byproducts, and queue order. Requirements for responsiveness are also severe. Typically, jobs that require attention must be served within one second to qualify as a responsive system. The sets of queues and job types also complicate the problem due to an ability for new queues and types to be created dynamically.

Thus there is a need for a system and method for increasing the responsiveness of a document processing device and the control of resource consumption by a document processing device using effective job management.

SUMMARY OF INVENTION

In accordance with the present invention, there is taught a system and method for managing processes in a document processing peripheral.

Further, in accordance with the present invention, there is taught a method for the effective job management of a print job by a job manager on a document processing device. The job manager analyzes a job ticket which includes data indicating one or more processes required to complete the print job. A job manager then ascertains the resource cost associated with the job ticket. The job manager then determines at least one of a plurality of job processors that performs the process. The job manager acts to identify those job processors corresponding to the processes of the job ticket and determines which of those processors are available for use. A list of a set of job processors is then assembled, including the job processor that performs the process. Job data is subsequently sent to the job processor, wherein the job data includes the list of job processors required to perform the processes on the print job. When the resources available are below those needed to fully process the job ticket, the manager assembles a partial pipeline. When the resources available meet or exceed those necessary to fully process the job ticket, the manager assembles a complete pipeline. The data is then sent to the processors which handle all processing without interference from the job manager.

One aspect of the present method includes notifying the job manager after each job processor has completed its corresponding process on the print job.

Further in accordance with the present invention, there is taught a system for effective job management of a print job by a job manager on a document processing device. The system includes means adapted for analyzing a job ticket, which includes data that indicates one or more processes required to complete the print job. The means adapted for determining a resource cost then ascertain the resource cost associated with the job ticket. The system also includes means adapted for determining which of a plurality of job processors performs the process. Means is provided for assembling then assembles a list of a set of job processors, including the job processor that performs the process. When the resources available are below those needed to fully process the job ticket, the system teaches assembling a pipeline act to assemble a partial pipeline of resources. When the resources available meet or exceed those necessary to fully process the job ticket, the disclosed system provides for assembling a pipeline act to assemble a complete pipeline of resources. Data sending means then forwards the data with the list of job processors to the first processor on the list. The data is then sent to the processors, which handle processing without interference from the job manager.

One aspect of the present system includes means adapted for notifying the job manager after each job processor has completed its corresponding process on the print job.

Yet further in accordance with the present invention, there is taught a computer-implemented method for the effective job management of a print job by a job manager on a document processing device. The job manager analyzes a job ticket, which includes data indicating one or more processes required to complete the print job. The job manager then ascertains the resource cost associated with the job ticket. The manager then determines at least one of a plurality of job processors that performs the process. The job manager acts to identify those job processors corresponding to the processes of the job ticket and determines which of those processors are available for use. A list of a set of job processors is then assembled, including the job processor that performs the process. The data is subsequently sent to the job processor, wherein the data includes the list of job processors required to perform the processes on the print job. When the resources available are below those needed to fully process the job ticket, the manager suitably assembles a partial pipeline. When the resources available meet or exceed those necessary to fully process the job ticket, the manager assembles a complete pipeline. The data is then sent to the processors, which handle all processing without interference from the job manager.

One aspect of the present computer-implemented method includes notifying the job manager after each job processor has completed its corresponding process on the print job.

Still other objects and aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE EMBODIMENTS

This invention is directed to a method and system for document processing job management. More particularly, this invention is directed to a method and system for job management of document processing wherein job management is divided into a pipeline assembly phase and a job processing phase.

Figure 1:
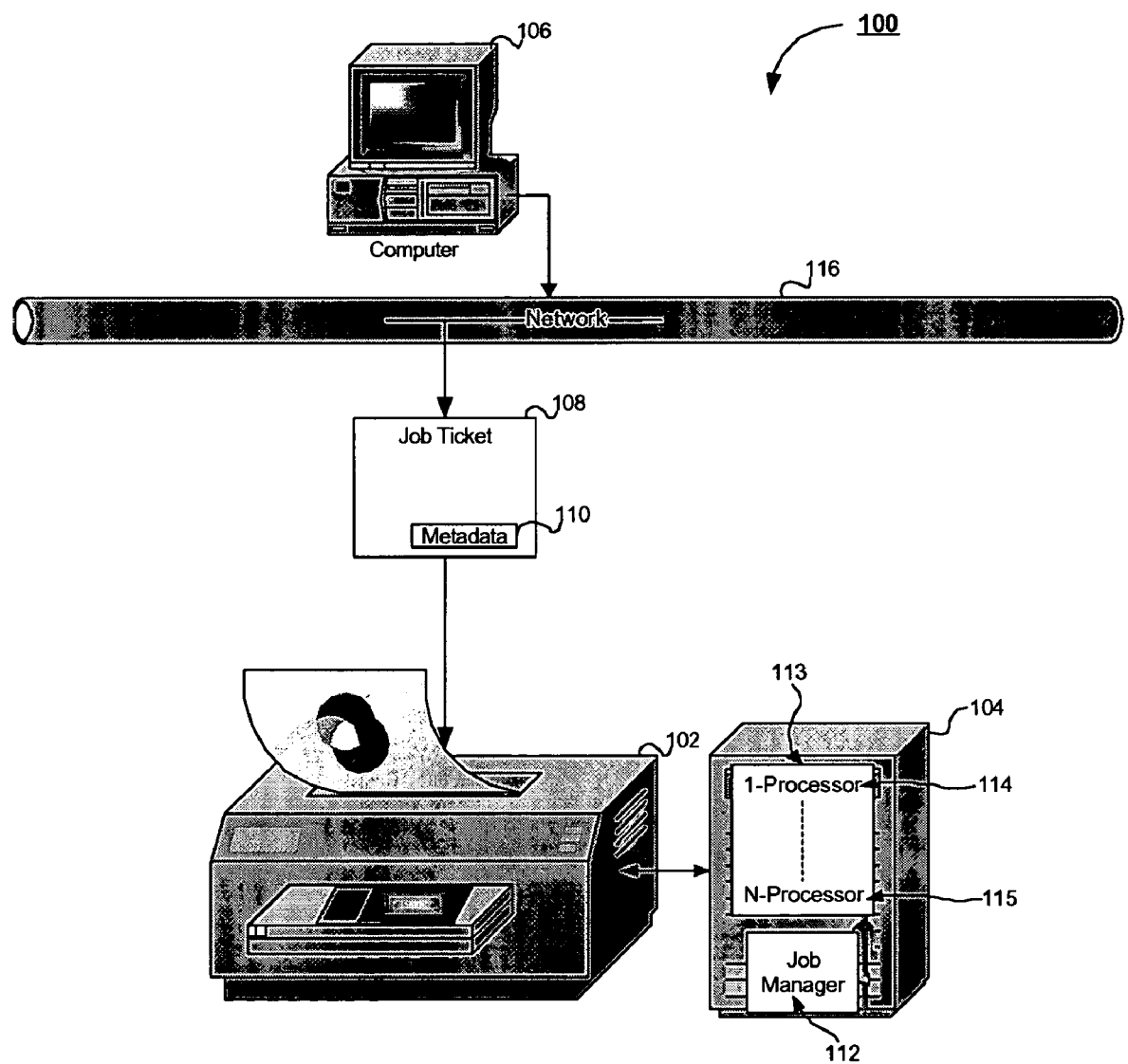
FIG. 1 is a block diagram of the system according to the present invention.

FIG. 1 illustrates a block diagram preferred embodiment of the system according to the present invention generally designated as 100. The system comprises at least one document processing peripheral, as illustrated by multi-function peripheral device 102, for generating or processing image data. It is to be appreciated that document processing peripheral is any suitable document processing device known in the art, such as a copier, printer, scanner, facsimile and the like, or any combination thereof. Suitable commercially available document processing peripherals include, but are not limited to, the Toshiba e-Studio Series Controller.

The document processing peripheral device 102 of the system 100 further comprises a controller 104, which controls the functions of the document processing peripheral as will be appreciated by one of ordinary skill in the art. As shown in FIG. 1, the controller 104 is illustrated as a component separate from the document processing peripheral device 102. It will be understood and appreciated by one skilled in the art that the subject invention is suitably capable of employing a controller 104 as an integrated component of the document processing peripheral device 102. The integrated controller 104 is advantageously any hardware, software, or combination thereof suitably capable of controlling the functioning of the document processing peripheral device 102 as will be appreciated by one of ordinary skill in the art. The controller 104 of the document processing peripheral 102 comprises a job manager 112 and job processors 113. The job manager 112 is communicatively coupled to the document processing peripheral 102.

The document processing peripheral device 102 is communicatively coupled to a computer network 116. The computer network 116 further comprises at least one electronic device capable of transmitting job data to the document processing peripheral device 102. As shown in FIG. 1, a personal computer 106 is suitably adapted to transmit job data over the computer network 116 to the document processing peripheral device 102 via any suitably transportation protocol. As shown in FIG. 1, a job ticket 108 suitably comprises document generation data enabling the document processing peripheral device 102 to output the document for which the job data pertains. The job ticket 108 further comprises job metadata 110, suitably adapted to direct the first job processor 114, the next job processor 115 or any of the job processors 113 in the processing of a print job to which the job metadata 110 corresponds.

Figure 2:
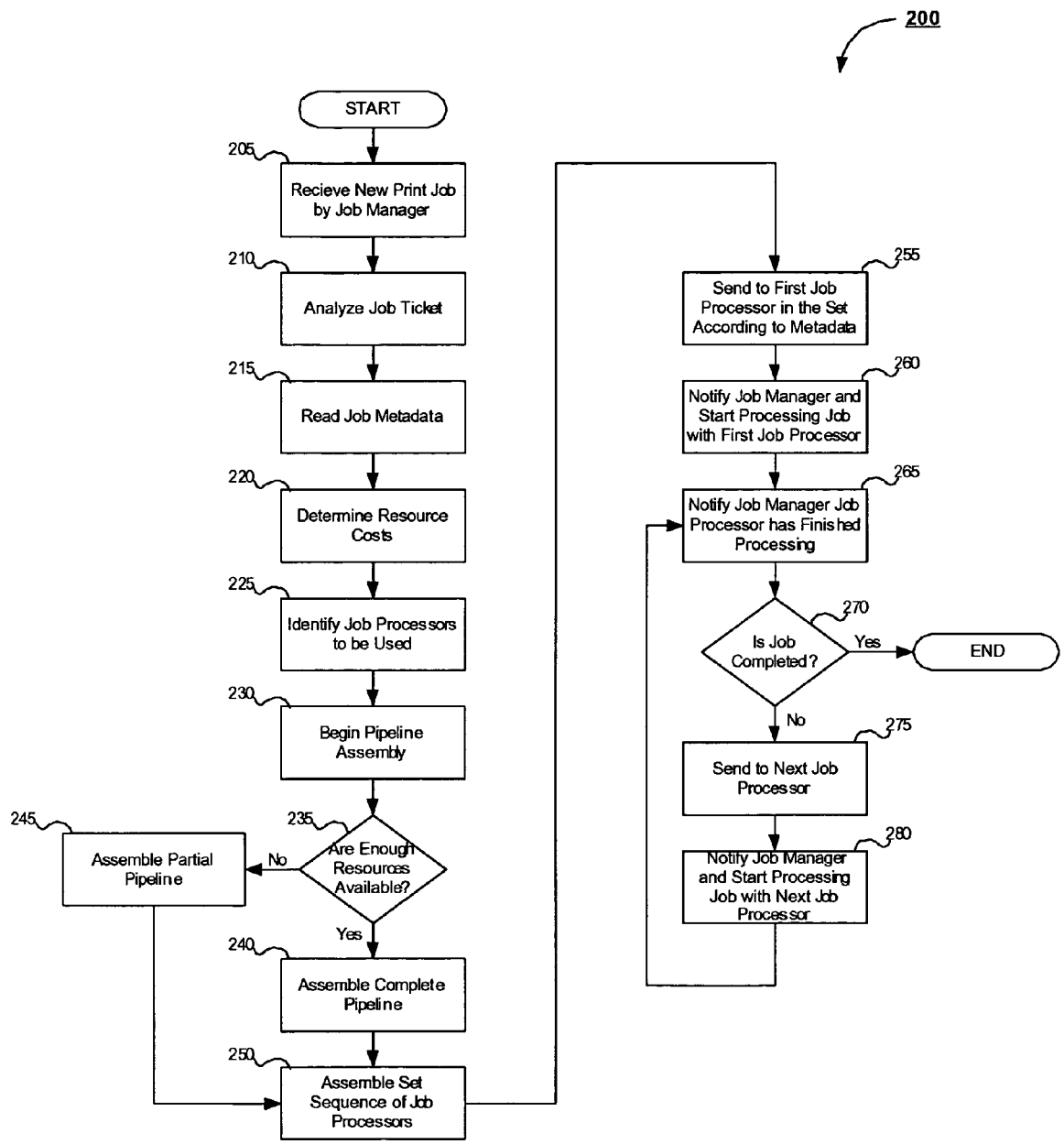
FIG. 2 is a flow chart illustrating the method according to the present invention.

Referring now to FIG. 2, there is shown a flow chart illustrating a preferred embodiment of the method according to the present invention generally designated as 200. The method begins at step 205 when the job manager 112 of the controller 104 of the document processing device 102 receives a new print job. As will be appreciated by those skilled in the art, a print job is any request for outputting a document by the document processing device, including data associated with the document. At step 210, the job manager 112 analyzes the job ticket to retrieve data pertaining to the print job. As will be understood by the skilled artisan, a print job is handled by any number of processors, which perform specific operations on the job. The instructions for such handling, e.g., workflow, are contained within the job ticket. The job ticket further includes additional information about the print job. This additional information, or metadata, instructs the job processors 113 in the processing of the print job. The metadata 110 is read by the job manager 112 at step 215, to enable the determination of resource costs associated with the print job at step 220.

Each of the job processors 113 uses portions of system resources, such as central processing unit time, memory space, etc., which are physically limited by the construction of the document processing device. The job metadata 110 enables the job manager 112 to identify, at step 225, those job processors 113 that are needed to completely process the print job. Once the job processors 113 have been identified, the job manager 112 begins, at step 230, the pipeline assembly phase of the method. It will be understood by those skilled in the art that the pipeline refers to the workflow for a particular print job.

The job manager 112 then determines at step 235 if enough resources are available to completely build the pipeline. When enough resources are available, the job manager assembles a complete pipeline at step 240. However, when an inadequate amount of resources are available, the job manager 112 assembles a partial pipeline at step 245. For example, the job manager 112 will preferably input data relating to stapling operations into the pipeline after data relating to collating operations is feed into the pipeline. The job manager 112 assembles partial data or operations into the pipeline in the event that all resources needed are not available. In the event that a stapling operation is not possible, the job manager 112 will still feed data related to other jobs so that the process may be completed to the extent possible.

Returning to FIG. 2, at step 250, the job manager 112 then assembles a listing of all job processors 113 that are available to process the job, in accordance with the pipeline established either in step 240 or 245. Accordingly, at step 255, the job manager 112 sends to the first job processors in the list of job processors 113 the print job along with the metadata 110. It will be understood by those skilled in the art that the metadata 110 suitably comprises additional information regarding the print job, which is forwarded to the job processors 114 based upon the job processors' 113 requirements.

The first job processor 114 in the listing of job processors 113 notifies the job manager 112 that it is ready to begin processing the print job and begins processing the print job at step 260. When the first job processor 114 has completed performing the process for which it was designated by the metadata 110, the first processor 114 notifies the job manager at step 265 of completion of processing. At step 270, a determination is made that the print job is not finished with all processing. It will be appreciated by those skilled in the art that while the job manager 112 is notified of the progress of the processing of a print job, the use of the pre-set list of processors enables the removal of the job manager 112 from advancing the print job from one of the job processors 113 to the next job processor 15.

At step 275, the print job, having been processed by the first processor at steps 260-265, is sent to the next job processor 115 in the list of job processors 113. It will be understood by those skilled in the art that the number of job processors 113 implemented by the present method is limited only by the processes offered by the document processing device. The skilled artisan will appreciate that any number of job processors 113 corresponding to the number of process capable of being performed by the document processing device are suitably adapted for use in the present mention.

After the next job processor 115 has received the print job at step 275, the method proceeds to step 280, wherein the next job processor 115 notifies the job manager 112 of the receipt of the print job and begins processing in accordance with the process represented by the next job processor 115. For example, if the first job processor 114 executed the scanning process, the next job processor 115 will handle the rasterizing process. Each subsequent job processor will execute a further element of the print job, from rendering to stapling to 3-hole punching. The skilled artisan will appreciate that each element of a print job has been parameterized by the job manager 112 during assembly of the list of processors.

When the next job processor 115 has finished processing the print job according to its designated process, the processor 115 notifies the job manager 112 that the process is complete by returning to step 265. When, at step 270, the job is completed, the document represented by the print job is output by any suitable means. That is, when the last processor in the list of processors 113 has finished processing the print job, the print job is deemed completed and output in accordance with the document processing device capabilities.

While the present system has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the system, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for effective job management of a plurality of simultaneous print jobs by a job manager on a document processing device, comprising the steps of:
   analyzing a job ticket including data indicative of a plurality of processes required to complete the print job;
   identifying a plurality of required job processors required to complete the plurality of processes for executing the plurality of jobs;
   determining at least one of a plurality of available job processors needed to perform each of the processes;
   associating the at least one available job processor with the job ticket;
   ordering the processes in accordance with relative dependencies therebetween and available job processors so as to create a pipelined process schedule adapted for serial processing;
   determining whether the required job processors are able to be completed with the available job processors;
   sending the data to each available job processor performing serial execution of each of the processes, so as to form a partially completed job;
   determining when additional required job processors are available to complete each uncompleted required process; and
   completing each uncompleted required process with the additional required job processors.

2. The method of claim 1, further comprising the step of determining a resource cost associated with the job ticket.

3. The method of claim 2, wherein the available resources are below the resource cost associated with the job ticket, further comprising the step of assembling a partial pipeline.

4. The method of claim 2, wherein the available resources are equivalent to the resource cost associated with the job ticket, further comprising the step of assembling a complete pipeline.

5. The method of claim 1, further comprising the step of processing the print job with a first job processor in accordance with the data included in the job ticket.

6. The method of claim 5, further comprising the steps of determining when the processing of the print job is complete by the first job processor and sending the print job to a second job processor in accordance with the data included in the job ticket.

7. The method of claim 6, further comprising the steps of:
   notifying the job manager upon the completion of processing by the first job processor; and
   notifying the job manager upon the completion of processing by the second job processor.

8. A system for effective job management of a plurality of simultaneous print jobs by a job manager on a document processing device, comprising:
   means for analyzing a job ticket including data indicative of a plurality of processes required to complete the print job;
   means for identifying a plurality of required job processors required to complete the plurality of processes for executing the plurality of jobs;
   means for determining at least one of a plurality of available job processors needed to perform each of the processes;
   means for associating the at least one available job processor with the job ticket;
   means for ordering the processes in accordance with relative dependencies therebetween and available job processors so as to create a pipelined process schedule for serial processing;
   means for determining whether the required job processes are able to be completed with the available job processor;
   means for sending the data to each available job processor performing serial execution of each of the processes, so as to form a partially completed job;
   means for adapted for determining when additional required job processors are available to complete each uncompleted require process; and
   means for completing each uncompleted required process with the additional required job processors.

9. The system of claim 8, further comprising means for determining a resource cost associated with the job ticket.

10. The system of claim 9, further comprising means for processing the print job with a first job processor in accordance with the data included in the job ticket.

11. The system of claim 10, further comprising means for determining when the processing of the print job is complete by the first job processor and sending the print job to a second processor in accordance with the data included in the job ticket.

12. The system of claim 11, further comprising:

means for notifying the job manager upon the completion of processing by the first job processor; and means for notifying the job manager upon the completion of processing by the second job processor.

13. The system of claim 8, further comprising means for assembling a partial pipeline.

14. The system of claim 8, further comprising means for assembling a complete pipeline.

* * * * *